March 28, 1967 W. W. HENSLEE, JR., ETAL 3,311,173
WELL BORE TESTING APPARATUS
Filed June 30, 1964 5 Sheets-Sheet 1

WALDO W. HENSLEE, JR.
DARRYL W. COCKRELL
INVENTORS.

BY Mellin, Moore & Weissenberger
ATTORNEYS.

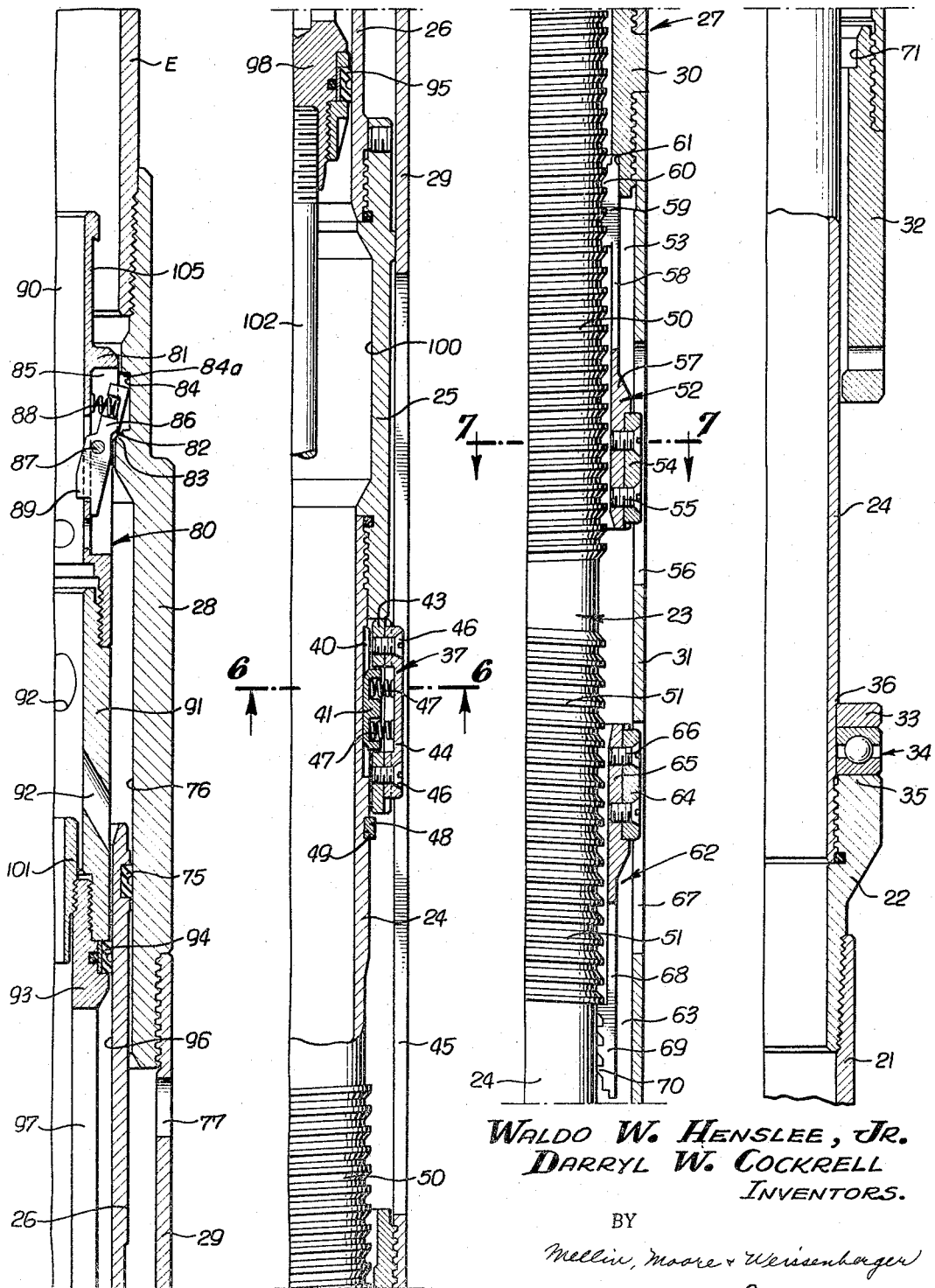

March 28, 1967  W. W. HENSLEE, JR., ETAL  3,311,173
WELL BORE TESTING APPARATUS
Filed June 30, 1964  5 Sheets-Sheet 3

WALDO W. HENSLEE, JR.
DARRYL W. COCKRELL
INVENTORS.

BY
Mellin, Moore & Weissenberger
ATTORNEYS.

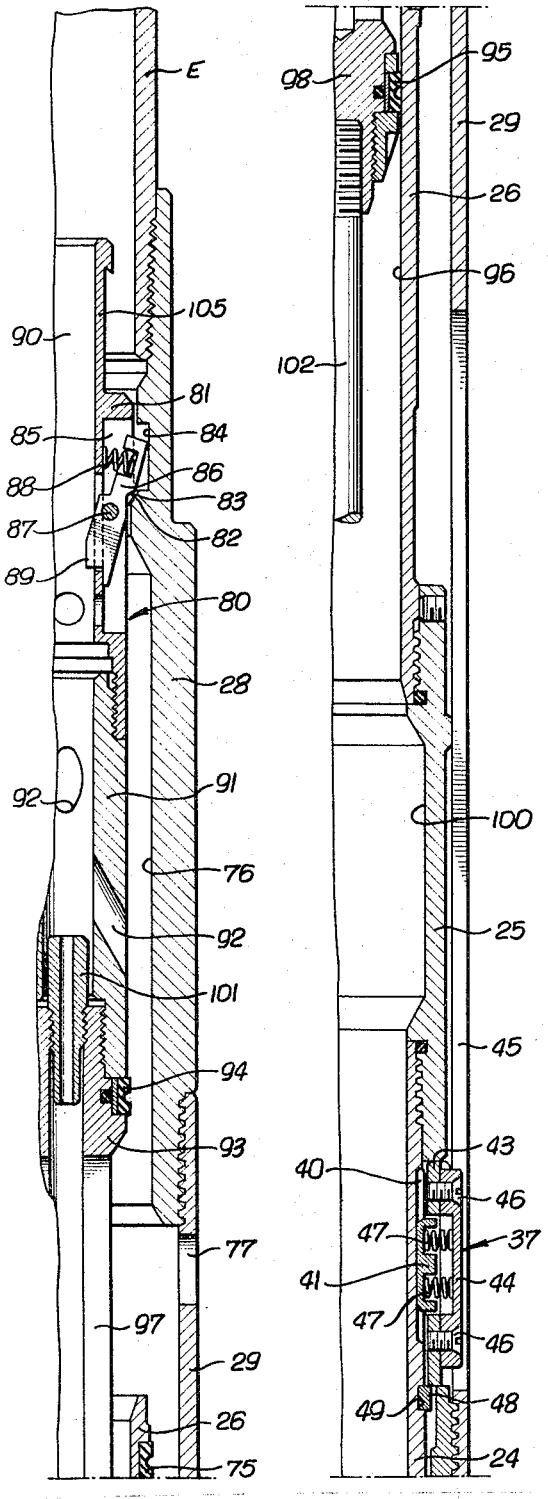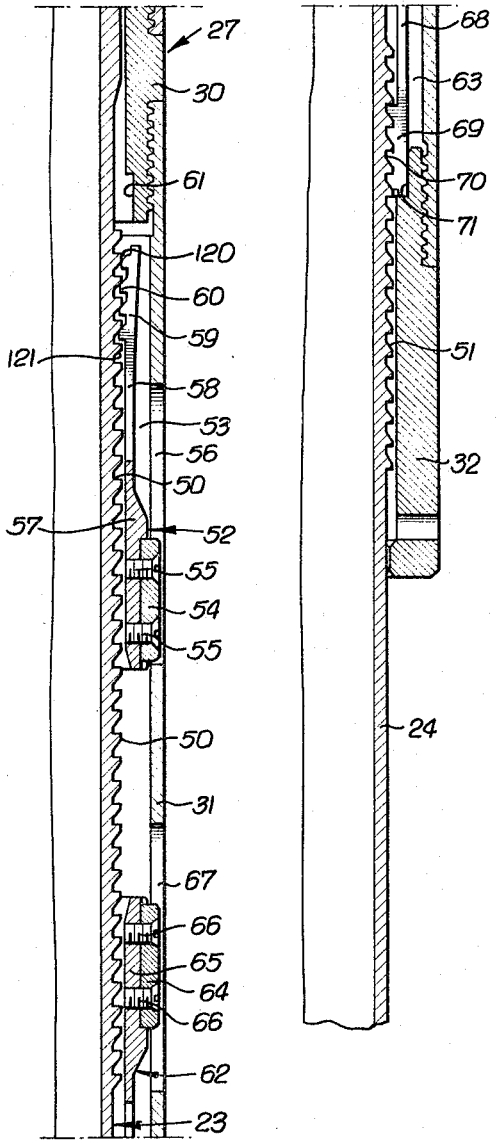

March 28, 1967 W. W. HENSLEE, JR., ETAL 3,311,173
WELL BORE TESTING APPARATUS
Filed June 30, 1964 5 Sheets-Sheet 5

WALDO W. HENSLEE, JR.
DARRYL W. COCKRELL
INVENTORS.

BY
Mellin, Moore + Weissenburger
ATTORNEYS.

United States Patent Office 3,311,173
Patented Mar. 28, 1967

3,311,173
WELL BORE TESTING APPARATUS
Waldo W. Henslee, Jr., and Darryl W. Cockrell, Houston, Tex., assignors to Baker Oil Tools, Inc., Los Angeles, Calif., a corporation of California
Filed June 30, 1964, Ser. No. 379,125
28 Claims. (Cl. 166—226)

The present invention relates to subsurface well bore apparatus, and more particularly to apparatus capable of performing testing, cement squeezing, acidizing, fracturing, and the like, in a well bore.

In United States Patent No. 3,096,823, subsurface apparatus is disclosed for performing testing operations in a well bore and also desired pressuring operations, without removing the apparatus from the well bore. The apparatus includes a reversing or unloading valve device that enables the fluid in the tubing string to which the apparatus is connected, and resulting from the test, to be reversely circulated from the tubing string without subjecting the formation to pressure. The apparatus embodies a tester portion capable of removal through the tubing string in the event the apparatus is to be used for pressuring purposes, and for lowering through the tubing string to be located in appropriately assembled relation in the event the apparatus is again to be used for downhole testing purposes.

An object of the present invention is to provide apparatus of the type disclosed in the aforementioned United States patent, which is of a substantially simplified construction, easy to operate, and dependable in use.

Another object of the invention is to provide a tester valve and an unloader or reversing valve that are combined in a single unit, thereby greatly shortening and simplifying the combined apparatus. The combined apparatus, with the tester valve portion removed, has a straight through and full opening passage through which fluids and other devices can pass readily.

A further object of the invention is to provide combined tester and reversing valve apparatus in which the tester valve portion of the apparatus can be shifted repeatedly between opened and closed position without inadvertently shifting the reversing valve portion of the apparatus to an open condition.

An additional object of the invention is to provide combined tester and reversing valve apparatus in which both the tester and reversing valve portions of the apparatus can be repeatedly shifted between their respective opened and closed positions while the apparatus remains in the well bore.

Yet another object of the invention is to provide combined tester and reversing valve apparatus adapted to be lowered in a well bore on a tubular string, in which the tester valve portion and reversing or unloader valve portions are operable in response to rotation of the tubular string in the same direction, which is preferably a right-hand direction, so as to eliminate the hazard of inadvertently loosening or disconnecting the tubular string at one of its threaded joints.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURES 1, 1a, and 1b together constitute a side elevational view through an assembly of apparatus in a well casing for performing a testing operation in a well bore, FIGS. 1a and 1b being lower continuations of FIGS. 1 and 1a, respectively;

FIGS. 2, 2a, 2b, and 2c together constitute a quarter longitudinal section through the tester and reversing valve portions of the apparatus, with both of such valve portions in their closed conditions, FIGS. 2a, 2b, and 2c being lower continuations of FIGS. 2, 2a, and 2b, respectively;

FIGS. 3, 3a, 3b, and 3c are views corresponding to FIGS. 2 to 2c, inclusive, with the tester valve portion of the apparatus having been shifted to an open condition, while the reversing or unloader valve portion of the apparatus remains in its closed condition;

FIGS. 4, 4a, 4b, and 4c are views corresponding to FIGS. 2 to 2c, inclusive, disclosing the unloader or reversing valve portion of the apparatus in open condition while the tester valve portion of the apparatus remains in a closed condition with respect to the well bore therebelow;

FIG. 6 is an enlarged cross-section taken along the line 6—6 on FIG. 2a;

Figure 1:
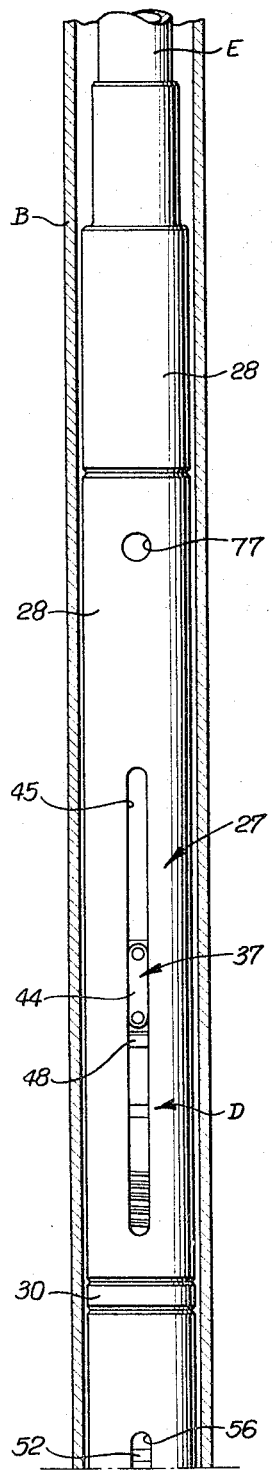
Figure 1A:
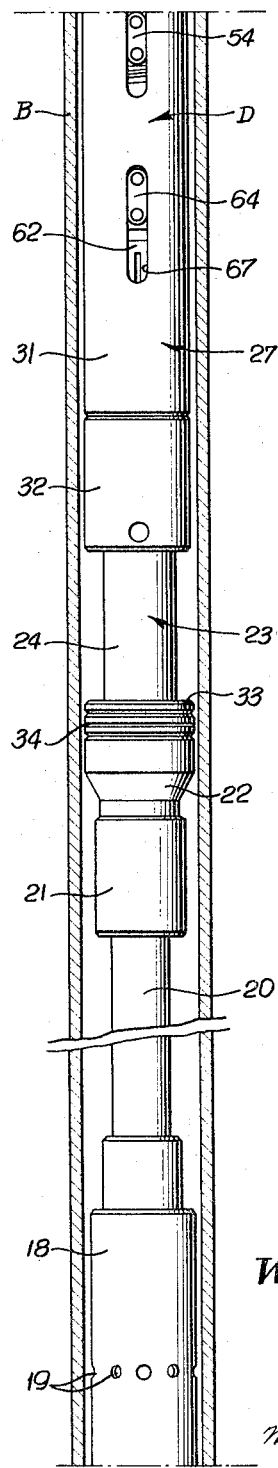
Figure 1B:
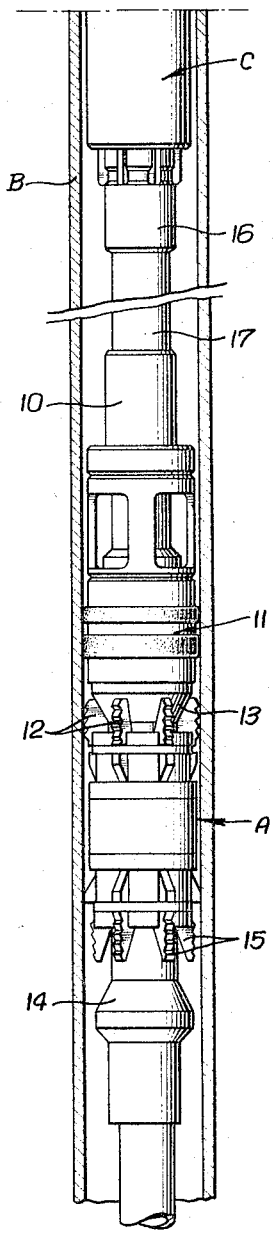

The apparatus disclosed in FIGS. 1, 1a and 1b is specifically designed for performing a testing operation in a well bore and also, if desired, for forcing fluent material under pressure into the well bore. As shown, the lower portion of the apparatus comprises a lower packer A adapted to be set in a well casing B into which the combined apparatus is lowered, there being an equalizer valve C above the lower packer which, in turn, is connected to a tester and reversing or unloader valve apparatus D thereabove, the upper end of which is suitably connected to a tubular runing-in string E extending to the top of the well bore.

The lower packer A and equalizer valve C form no part of the present invention, and may assume various desired specific constructions. By way of example, the well packer and equalizer valve may be of the type disclosed and described in the aforementioned United States Patent 3,096,823.

In general, the lower packer A includes a body portion 10 and a packing structure 11 for sealing against the wall of the well casing. It can be anchored in the well casing against downward movement because of the co-action between an upper set of slips 12 and an upper expander 13 wedging the upper slips against the casing wall. If desired, it can be anchored in packed-off condition against upward movement in the well casing by the co-action between a lower expander 14 and a lower set of slips 15. When the lower expander 14 is moved upwardly from the position illustrated in FIG. 1b, it will engage the lower slips 15 and expand them outwardly into anchoring engagement with the casing wall.

The well packer body 10 is connected to the inner mandrel 16 of the equalizer valve by means of a suitable tubular connector 17, this inner mandrel being telescoped within the outer housing 18 of the equalizer valve. As described in the above referred to United States patent, the equalizer valve C can be placed in an open condition, in which fluid can flow from its interior through circulation ports 19 in its housing 18 to its exterior. It can be placed in a position closing the circulation ports 19 both when the well packer A is anchored in the well casing B against downward movement and when anchored in the well casing against upward movement.

The equalizer valve C is connected by means of a tubular connector member 20 and a coupling 21 to a lower sub or connector 22 constituting the lower terminal member of an inner tubular member or control mandrel 23 forming part of the combined tester valve and reversing valve apparatus D. The sub 22 is threadedly secured to a lower section 24 of the tubular mandrel, the upper end of which is, in turn, threadedly attached to the lower portion of an intermediate section 25 of the mandrel, this latter part being threadedly secured to the upper section 26 of the control mandrel 23.

The tester and reversing valve apparatus D also includes an external tubular member or housing 27 surrounding the mandrel 23. This housing comprises an upper sub 28, the upper end of which is threadedly secured to the lower end of the tubular string E extending to the top of the well bore, and the lower end of which is threadedly secured to the upper end of an upper housing section 29. The lower portion of this upper housing section is threadedly attached to a coupling and upper latch retainer 30, which, in turn, is threadedly secured to the upper portion of a lower housing section 31, the lower end of which is, in turn, threadedly secured to a lower latch retainer 32. The lower end of the latch retainer 32, when the housing 27 is in its lowermost position with respect to the mandrel 23, engages a thrust plate 33 that bears against a suitable anti-friction thrust bearing 34 resting upon a shoulder 35 provided by the upper end of the sub or connector. The thrust bearing assembly 33, 34 remains in appropriate position on the mandrel 23 by virtue of the fact that it is retained between a mandrel shoulder 36 overlying the thrust plate 33 and the thrust shoulder 35 of the sub 22.

Figure 5:
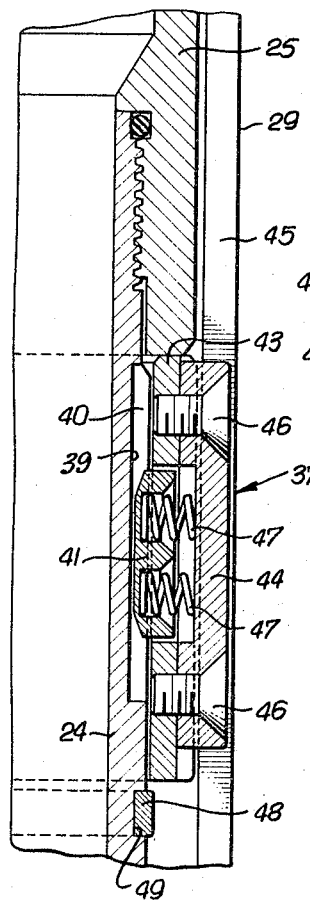
FIG. 5 is an enlarged fragmentary longitudinal section of the overrunning or one-way clutch portion of the apparatus.

Since some turning of the well packer body 10 may be necessary in effecting its setting and release in the well casing B, torque can be transmitted from the tubing string E and through the housing 27 to the mandrel 23, which is connected to the well packer A through the upper tubular connector member 20, equalizing valve C, and lower tubular connector member 17. Such torque or turning effort is transmittable through a one-way clutch device 37 provided between the housing 27 and the mandrel 23, which will permit rotation of the housing 27 in a right-hand direction with respect to the mandrel 23, but which will couple the housing to the mandrel when a counterclockwise or left-hand turning effort is imparted to the housing. As disclosed (FIGS. 5 and 6), the one-way clutch includes diametrically opposed clutch recesses or pockets 38 in the exterior of the mandrel section 24 immediately below the intermediate section 25, the base 39 of each recess tapering from the periphery of the mandrel to a transverse shoulder 40. A clutch dog 41 is movable into and out of each recess 38, such dog being slidable radially in a slot 42 in a clutch housing 43 surrounding the mandrel, the clutch housing being slidably splined to the upper housing section 29 by virtue of keys 44 in alignment with the dogs extending into elongate slots or keyways 45 in the upper housing section, the keys being suitably secured to the clutch housing 43, as by screws 46. Each key 44 also serves as a seat for helical compression springs 47 bearing thereagainst and also against a dog, urging the latter inwardly against the mandrel section 24. Substantial longitudinal movement of the clutch housing 43 relative to the mandrel 23 is prevented by the lower end of the intermediate mandrel section 25 and by a retainer ring 48 fixed to the mandrel 23 within a groove 49 below the housing 43.

Figure 6:
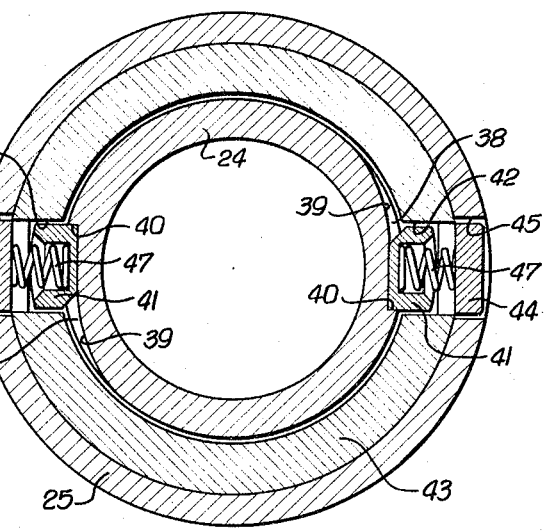
Figure 7:
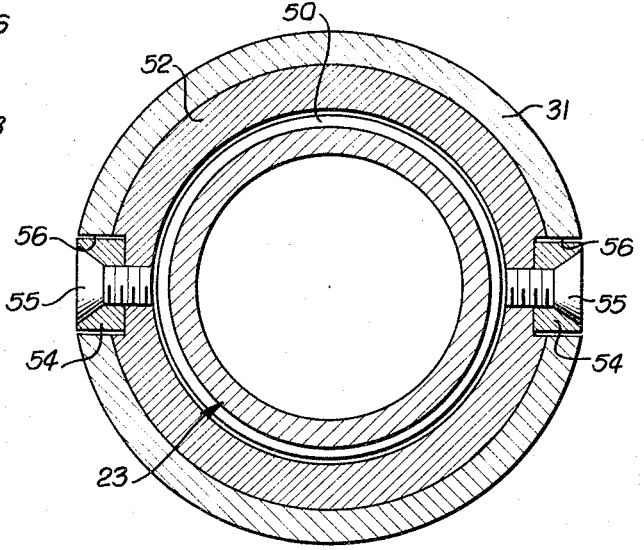
FIG. 7 is an enlarged cross-section taken along the line 7—7 on FIG. 2b.

It is evident from FIG. 6 that right-hand rotation of the housing 43 can occur (counterclockwise as seen in FIG. 6) without correspondingly turning the mandrel 23, inasmuch as the dogs 41 will ride outwardly on the tapered bases 39 of the grooves 38 and onto the periphery of the mandrel section 24. However, in the event the housing 27 is turned in a left-hand direction, the dogs 41 will engage the transverse shoulders 40 and transmit torque from the housing to the mandrel 23, the housing and mandrel being positively coupled to one another. If desired, the springs 47 may exert sufficient force to create sufficient friction between the clutch dogs 41 and the mandrel 23 so that a certain amount of right-hand torque can be transmitted between the housing and the mandrel for the purpose of manipulating other items of apparatus connected to the mandrel 23, such as the equalizing valve C and the well packer A.

The housing 27 can be shifted downwardly and upwardly relative to the mandrel 23 under the control of threaded interconnections therebetween. The mandrel has an upper or tester valve control thread 50, of buttress type, which is right-hand and which preferably has a multiple pitch, such as a triple pitch, and also a lower or reversing valve thread 51 specifically constituted as a left-hand buttress thread and preferably of multiple pitch, such as a triple pitch. The main purpose of the upper right-hand thread portion 50 of the mandrel 23 is to control the shifting of a tester valve portion of the apparatus between open and closed positions; whereas, the main purpose of the lower left-hand threaded portion 51 is to control the shifting of the unloader or reversing valve portion of the apparatus between open and closed conditions. The placing of the tester valve portion and the unloader or reversing valve portions in their open and closed conditions is dependent upon control of the relative longitudinal movement of the outer housing 27 relative to the inner tubular member or mandrel 23.

An upper latch or shuttle sleeve 52 is disposed in the annular space 53 between the mandrel 23 and the lower housing section 31, which is slidably splined to the latter, as by means of one or more keys 54 suitably attached thereto, as by screws 55 or the like, and each extending into a slot or keyway 56 in the lower housing section 31. Extending upwardly from the circumferentially continuous portion 57 of the upper latch sleeve are a plurality of latch arms 58 terminating in upper latch fingers or dogs 59 having internal threads 60 companion to and adapted to mesh with the external right-hand threads 50 of the mandrel 23. When the threaded latch dogs 59 are fully meshed with the right-hand thread 50, their upper portions can move into a retaining counterbore 61 of the coupling and upper latch retainer 30. When disposed in the counterbore, lateral movement of the threaded fingers or dogs 59 from meshing relation to the mandrel thread 50 cannot occur.

A lower latch sleeve 62 is adapted to coact with the lower left-hand thread 51 of the control mandrel 23 and is disposed in the annular space 63 between the mandrel and the lower housing section 31. This lower latch sleeve is slidably keyed or splined to the lower housing section by securing one or more keys 64 to its circumferentially continuous portion 65 by screws 66 or the like, each key extending into a lower slot or keyway 67 in the housing section 31. Spring-like arms 68 depend from the circumferentially continuous portion 65 of the latch sleeve, merging into fingers or dogs 69 having internal threads 70 companion to and adapted to mesh with the left-hand thread 51 of the mandrel 23. When the lower portions of these threaded fingers or dogs 69 are disposed within a counterbore 71 in the lower latch retainer 32, they are retained in full threaded engagement with the lower left-hand thread 51 and cannot spring laterally outwardly with respect thereto.

The upper latch dogs 59 inherently tend to move inwardly to remain in full threaded mesh with the upper threaded mandrel portion 50. Similarly, the lower fingers or dogs 69 tend to inherently assume an inward position in full threaded mesh with the lower left-hand thread 51. However, when disposed outside of their respective counterbores 61, 71, the fingers or dogs can spring outwardly to permit relative ratchetting between them and the threaded portions 50, 51 of the mandrel with which they normally coengage. When the upper latch fingers or dogs 59 are disposed in their retaining counterbore 61, the lower fingers or dogs 69 are disposed out of their retaining counterbore 71, and vice versa. Rotation of the external housing 27, as to the right, will impart rotation to both latch sleeves 52, 62. However, the only latch sleeve that will be threaded along the mandrel 23 will be the one disposed in its retaining counterbore. The other latch sleeve will have its fingers or dogs out of its counterbore so that such fingers or dogs, if need be, can be deflected outwardly by the tapered portions of their companion thread, permitting relative longitudinal ratchetting movement between such fingers or dogs and its companion thread.

When the unloader or reverse circulating valve portion of the apparatus is in closed position, a seal ring 75 on the upper section 26 of the mandrel 23 is in slidable sealing engagement with a companion cylindrical seat or sealing surface 76 of the upper sub 28, preventing fluid from passing between the interior of the tubing string E, upper sub 28, and mandrel 23, through a plurality of circulating ports 77 in the upper portion of the upper housing section 29 to the exterior of the housing 27, and also in the opposite direction. When, however, the outer housing 27 is relatively elevated so that the cylindrical seat 76 is disposed above the seal ring 75, as shown in FIG. 4, for example, fluid can pass between the interior and the exterior of the apparatus.

The tester valve portion of the apparatus includes the inner tubular member or mandrel 23 and also a retrievable mandrel or body 80 which is adapted to be lowered down the tubing string E and releasably secured to the outer housing 27. As shown, the retrievable mandrel or body 80 includes an upper lock mandrel section 81 having a downwardly facing shoulder 82 adapted to come to rest upon a companion upwardly facing shoulder 83 in the upper sub 28, which is disposed below an internal circumferential groove 84 in the upper sub. The lock mandrel section has a plurality of slots 85 in which lock dogs or latches 86 are pivotally mounted on hinge pins 87, the upper portions of the lock dogs being urged outwardly and into the circumferential groove 84 by helical compression springs 88 bearing against the mandrel and against the dogs. When the dogs are disposed outwardly in the groove 84, their lower nose portions 89 below the hinge pins 87 extend inwardly of the central passage 90 through the lock mandrel section 81. These nose portions are adapted to be engaged by a suitable retrieving tool (not shown) to swing the lower portions of the dogs 86 outwardly and their inner portions inwardly out of the groove 84, when the mandrel 80 is to be released and retrieved from the housing 27.

The lower portion of the lock mandrel section 81 is threadedly secured to a circulation section 91, having side ports 92 therein, this circulation section, in turn, having its lower portion threadedly secured to a valve head or piston valve member 93. This valve head has external upper and lower longitudinally spaced seal rings 94, 95 mounted thereon adapted to seal against a companion cylindrical valve seat 96 provided in the upper section 26 of the mandrel 23, the seal rings 94, 95 being disposed on opposite sides of elongate ports 97 extending through the valve head 93 to its interior. The lower end 98 of the valve head is solid so that when the lower seal ring 95 is engaged with its companion cylindrical seat 96, the valve head is in a closed position, and fluid cannot pass from below the head through the ports 97 to the interior of the head. When the valve head 93 has been shifted relatively downwardly along the inner tubular member or mandrel 23, as described hereinbelow, the lower seal ring 95 is disposed substantially below the cylindrical seat 96 and within an enlarged diameter passage portion 100 of the intermediate section 26 of the mandrel, allowing fluid to flow upwardly through the mandrel 23 and through the ports 97 to the interior of the valve head 93, the fluid then flowing upwardly through a choke or orifice 101 threaded in the upper portion of the head into the circulation section 91 of the retrievable mandrel 80, and then upwardly through its lock mandrel section 81 into the tubing string E thereabove. An extension rod 102 is secured to the lower portion of the head 93 to support a pressure recorder (not shown).

The retrievable mandrel or body portion of the valve apparatus can be assembled initially in position within the housing 27 and cylindrical seat 96, as in the closed position illustrated in FIGS. 2 and 2a, or the apparatus can first be lowered through the casing B and the retrievable mandrel or body 80 then lowered through the tubing string E, the lock mandrel section 81 coming to rest upon the upper sub shoulder 83, its latches 86 being shifted outwardly by the springs 88 into the lock groove 84. This definitely locks the retrievable mandrel 80 to the outer housing 27 against any significant longitudinal movement in both upward and downward directions. Downward movement is prevented by the co-engagement between the shoulders 82, 83, upward movement being prevented by engagement of the lock dogs or latches 86 with the upper side 84a of the circumferential groove 84. Since the retrievable mandrel 80 is locked to the outer housing 27, it will move longitudinally therewith and relative to the inner tubular member or mandrel 23 in controlling opening and closing of the tester valve portion of the apparatus and also of the reversing valve portion of the apparatus.

When the retrieving mandrel or body 80 is to be removed from the apparatus, a suitable retrieving tool (not shown), such as an overshot, can be lowered through the tubing string E and will become coupled to the fishing neck portion 105 of the lock mandrel section 81, a depending portion thereof engaging the noses 89 of the latches 86 and shifting the locking dog portions of the latches inwardly out of the circumferential groove 84, the retrieving mandrel 80 then being elevated from the apparatus and through the tubing string E to the top of the well bore, leaving a fully open, unobstructed bore or passage through the apparatus.

The valve apparatus D may be assembled preparatory to being lowered in the well casing with the parts in the relative positions and condition illustrated in FIGS. 2 to 2c, inclusive. When in such condition, it is to be noted that both the upper and lower seal rings 94, 95 of the valve head 93 are engaging the cylindrical seat 96, which is a tester valve closing position. The threaded dogs 69 of the lower latch sleeve 62 are below and out of threaded engagement with the left-hand mandrel threads 51, whereas the threaded dogs 59 of the upper latch sleeve 52 are in full threaded mesh with the upper right-hand threads 50 of the mandrel 23, and are disposed in the retaining counterbore 61 of the upper latch retainer 30. At this time, the keys 44 of the one-way clutch 37 are in an intermediate postiion within their relatively long slots or keyways 45 of the housing 27, the keys 54 of the upper latch sleeve are in an intermediate position within their slots or keyways 56, and the keys 64 of the lower latch sleeve may be disposed in the upper portions of the slots or keyways 67, although, at this time, they could occupy almost any position along the length of the slots or keyways 67. The lower latch retainer 32 is spaced a substantial distance above the thrust plate 33.

The lower packer A is attached to the tubular connector 17, which is, in turn, secured to the equalizer valve C. The equalizer valve is connected to the upper tubular connector 20, which is, in turn, threadedly attached to the coupling 21 secured to the sub 22 of the valve apparatus D. The upper sub 28 of the valve apparatus is threadedly attached to the tubing string E. This combination of apparatus is lowered in the well casing B with the tubing string in a dry condition, if desired, or a suitable water cushion can be placed therein after the tubing string has been lowered in the well casing. When the setting depth in the well casing is reached, the well packer A is set, as in the manner described in Patent 3,096,823, by turning the tubing string E in the appropriate direction, the turning effort or torque being transmitted through the housing 27 and the one-way clutch 37 to the inner tubular mandrel 23, which is connected through the equalizer valve C to the well packer. An appropriate weight is set down on the well packer to expand its upper slips 12 against the well casing and the packing structure 11 against the well casing. The imposition of a sufficient weight on the tubular string will also result in the equalizer valve C being closed. During the setting of the well packer in the well casing and the closing of the equalizer valve, the tester valve portion D of the apparatus will remain in the closed condition illustrated in FIGS. 2 to 2c, inclusive.

The tester portion of the apparatus can now be opened. The tubular string E is now rotated to the right, and such rotation is transmitted through the external tubular member or housing 27 to the one-way clutch dogs 41, which can ratchet freely around the inner tubular mandrel 23, since the latter is prevented from rotating by the fact of the well packer A being anchored in the well casing. The rotary motion of the housing 27 is transmitted through the keys 54 to the upper latch sleeve 52 which is held in threaded mesh with the upper right-hand threaded portion 50 of the mandrel by virtue of its retention in the retaining counterbore 51 of the upper latch retainer 30. The lower latch sleeve 62 also rotates with the external housing 27, but inasmuch as the threaded dogs 69 are out of mesh with the lower left-hand thread 51 of the mandrel, their rotation has no effect on the operation of the apparatus. The rotation of the housing 27 with the appropriate set-down weight being imposed on the tubing string E and the housing 27 causes the threaded upper dogs 59 to thread downwardly along the upper threaded portion 50 of the mandrel, the housing 27 moving downwardly with it. As the housing moves downwardly, the retrievable inner mandrel 80 also moves downwardly, since the downward motion is transmitted to it through the lock dogs or latches 86. When sufficient turns have been taken on the housing, which, for example, may be about six turns, the valve head portion 93 of the retrievable mandrel will have been shifted downwardly within the inner mandrel 23 to place its lower seal 95 out of engagement with its companion cylindrical seat 96 and within the enlarged diameter passage portion 100 of the intermediate section 25 of the inner mandrel.

Figure 3:
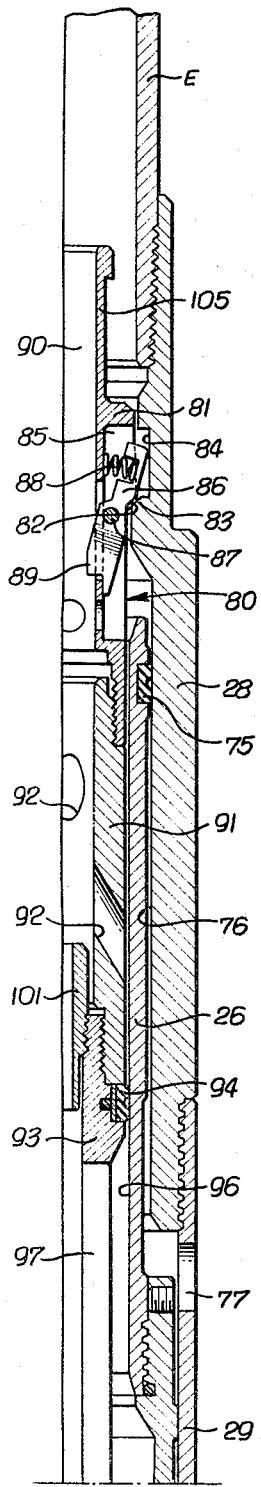
Figure 3A:
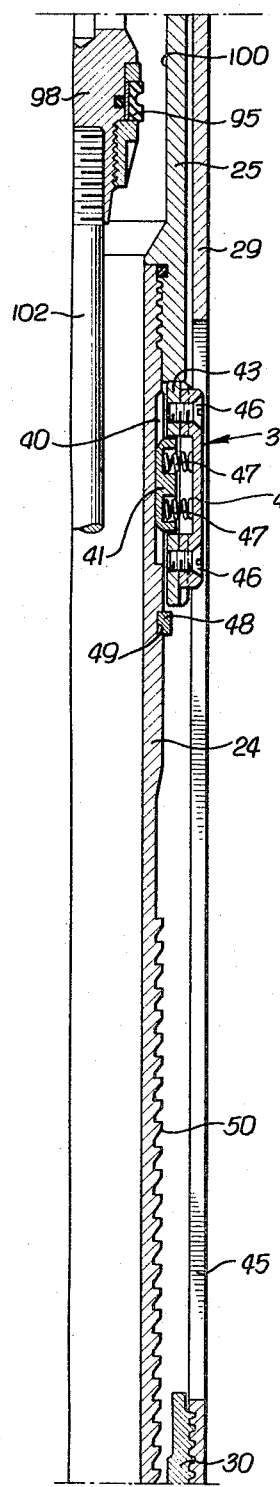
Figure 3B:
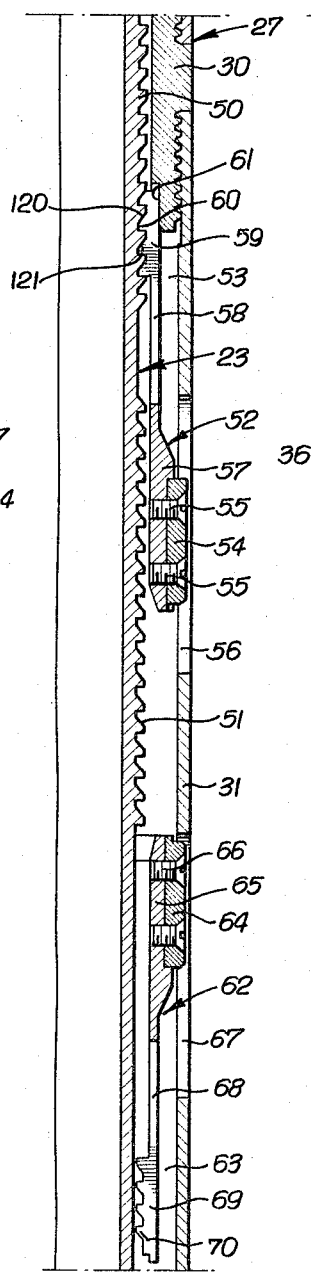
Figure 3C:
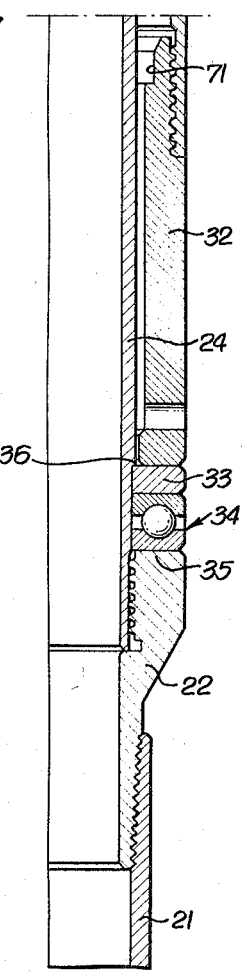

The tester valve is now in open condition and fluid can pass upwardly through the well packer A, equalizer valve C, and inner tubular member 23, flowing through the elongate valve head ports 97 and upwardly through the choke orifice 101, and through the retrievable mandrel or body 80 into the tubing string E thereabove. Rotation of the housing 27 relative to the inner tubular member or mandrel 23 can occur, to feed the housing downwardly of the mandrel, to the extent limited by engagement of the lower latch retainer 32 with the thrust plate 33 of the thrust bearing structure (see FIGS. 3 to 3c, inclusive). Rotation can continue to a further extent, but will have no effect on the downward movement of the housing 27 relative to the inner tubular mandrel 23. The upper latch sleeve 52 will continue to thread downwardly along the upper threaded portion 50 of the mandrel to the extent limited by engagement of the keys 54 with the lower housing section at the lower portions of the slots or keyways 56, at which time the latch dogs will have moved out of the retaining counterbore 61 of the upper latch retainer 30. If the tubular string E and housing 27 were to continue to rotate to a further extent, the upper latch fingers 59 would merely be shifted by the external right-hand thread 50 out of mesh therewith, such outward deflection of the fingers 59 and arms 58 being permitted by the fact that they are disposed within the annular space 53 between the lower housing section 31 and upper threaded portion 50 of the mandrel below the retaining counterbore 61.

Because of the overriding feature of the latch fingers or dogs 59 on the threads 50, after the latch fingers or dogs have been lowered out of the retaining counterbore 61, continued rotation of the tubing string E and housing 20 cannot adversely affect the apparatus. Rotation can continue while set-down weight is imposed on the tubing string and housing since such set-down weight is transmitted through the thrust bearing 34 to the thrust shoulders 35, the thrust bearing being of the roller or ball type so as to minimize friction.

With the upper latch dogs 59 unrestrained, the continued rotation of the housing 27 and the ability of the latch dogs 59 to ratchet freely relative to the threads 50 will be indicated at the top of the well bore by the fact of significant reduction of the torque necessary to rotate the tubing string E and housing 27. Thus, an indication is given to the operator at the top of the well bore that the tester valve portion of the apparatus is open.

If it is desired to close the tester valve portion of the apparatus, this can be accomplished readily by taking a straight upward movement of the tubing string E and the housing 27. It is to be noted that the inverted fingers or dogs 69 of the lower latch sleeve 62 are far below the lowermost turn of the left-hand thread 51 when the tester valve is in open position (FIG. 3b), so that there is no interference to upward movement of the housing 27 offered by the lower latches 69. The upper latches 59 are out of their retaining counterbore 61, the lower ends of the keyways or slots 56 engaging the keys 54 and shifting the latch dogs or fingers 59 upwardly along the upper right-hand thread 50, the dogs being capable of deflecting outwardly due to the coengagement between their upper sloping faces 120 and the lower sloping sides 121 of the buttress threads 50 of the mandrel 23, until the housing 27 and the inner retrievable mandrel or body 80 have been moved upwardly substantially to their initial position in which both of the upper and lower seal rings 94, 95 of the valve head are again disposed within the cylindrical seat 96 of the upper section 26 of the inner tubular member or mandrel 23. A slight lowering of the tubing string E and housing 27 will lower the upper latch retainer 30 with respect to the upper latch fingers 59 and relocate them relatively within the retaining counterbore 61, as in FIGS. 2 to 2c, inclusive.

The tester valve can be opened again by appropriately turning the tubing string E and housing 27 to the right, and its reclosing can be effected by taking a straight upward pull on the tubular string and housing, all in the manner described above. Thus, the tester valve can be readily shifted between opened and closed positions as often as desired, right-hand rotation being required to locate the tester valve in an open position and a straight upward pull only being necessary to reclose the valve.

With the tester valve reclosed, it may be desired to recover a test sample that has flowed upwardly into the tubing string E. This can be readily secured by opening the reversing or unloader valve portion of the apparatus while the tester valve portion is retained in its closed position.

To open the reversing or unloader valve portion, the parts are initially in the position illustrated in FIGS. 2 to 2c, inclusive. An upstrain is taken on the tubular string E and the housing 27 while they are rotated to the right. Such upward movement will first result in upward shifting of the upper latch retainer 30 to remove its counterbore portion 61 from encompassing relation to the upper latch dogs 59 and will place the counterbore portion 71 of the lower latch retainer 32 over the lower threaded fingers or dogs 69 of the lower latch sleeve 62, confining them in their inward position with respect to the inner tubular mandrel 23. As the tubular string E and housing 27 are rotated to the right with an upstrain thereon, the left-hand lower threaded fingers or dogs 69 thread onto the left-hand threads 51 of the mandrel 23, such threaded movement permitting the housing 27 to move upwardly relative to the inner mandrel 23, the upper dogs 59 merely ratchetting freely along the right-hand upper threaded portion 50 of the inner mandrel. The upward feeding of the housing 27 relative to the mandrel 23 carries the retrievable mandrel 80 upwardly with it, the upper seal 94 of the valve head 93 moving upwardly out of the cylindrical seat 96, and the cylindrical seat 76 of the upper sub 28 moving upwardly above the seal ring 75 on the exterior of the inner tubular member 23, both the outer housing 27 and the retrievable mandrel 80 moving upwardly to the extent limited by engagement of the upper end of the upper latch retainer 30 with the clutch housing 43, the parts then being in the position illustrated in FIGS. 4 to 4c, inclusive, in which the lower valve head seal 95 is still in sealing engagement with the cylindrical seat 96 of the inner tubular member 23, the tester valve portion still being closed, but in which communication is established between the exterior of the housing 27 and the interior of the tubular string E. Thus, fluid can be pumped downwardly through the annulus between the tubular string E and casing B, such fluid passing inwardly through the circulation ports 27 of the housing, some of the fluid moving through the valve head ports 97 and upwardly through the orifice 101, but the major portion of the fluid passing upwardly between the mandrel 80 and housing 27 and through the circulation ports 92 into the central passage through the retrievable mandrel, flushing the fluid sample in the tubular string E upwardly therethrough to the top of the well bore. During such reverse circulation of the fluid, the circulation pressure is not imposed on the formation below the well packer A, which remains anchored in packed-off condition in the well casing B, in view of the closing action of the lower seal 95 on the valve head with the cylindrical wall 96 of the inner tubular member 23.

If the reversing or unloading valve portion of the apparatus is to be reclosed, a suitable set-down weight is imposed on the tubular string E and the housing 27. Initially, the housing 27 will move downwardly, to remove the lower retainer counterbore 71 from encompassing relation to the lower dogs 69, allowing them to be deflected out of threaded mesh with the left-hand threads 51 of the mandrel 23. Such lowering movement will cause the upper retaining counterbore 61 to again encompass the upper latch dogs 59, whereupon rotation of the tubular string E and housing 27 to the right, with downweight being imposed thereon, will cause the upper dogs 59 to thread in a downward direction along the mandrel 23, allowing the housing 27 to move downwardly along the mandrel, the unconfined lower latch dogs 69 ratchetting freely along the left-hand threads 51 of the mandrel. A sufficient number of turns, which, for example, may be more than ten turns, will insure the shifting of the housing 27 downwardly to bring its cylindrical seat 76 in sealing and encompassing relation to the inner mandrel seal ring 75, thereby closing the reversing valve portion of the apparatus. Sufficient turns are taken such that the lower dogs 69 are again disposed below the lowermost turn of the left-hand threaded portion 51 of the inner tubular member 23, whereupon a straight-line upward movement of the tubular string and mandrel will cause the housing 27 to shift the lower latch sleeve 62 upwardly until the upper ends of its dogs 69 again engage the lowermost turn of the left-hand threaded portion 51 of the mandrel 23. Such upward movement may be accompanied by free upward ratchetting of the upper latch elements 59 along the right-hand threads 50, inasmuch as their retaining counterbore 61 will be disposed thereabove. A slight lowering of the tubular string E and housing 27 will again lock the upper latch fingers or dogs 59 in threaded engagement with the upper test valve control threads 50, the dogs being confined within the counterbore 61, the parts again being in the positions illustrated in FIGS. 2 to 2c, inclusive.

In the event it is desired to perform a pressuring operation through the apparatus, the retrievable mandrel or body 80 can readily be removed therefrom through use of a suitable overshot (not shown), as described above, leaving an unobstructed and fully open passageway through the tester valve. Not only can cementitious material, fracturing material, acid, and the like, be pumped freely through the apparatus, but other devices can also be moved therethrough because of the large passage area provided through the combined tester and unloader valve. For example, a perforating gun can be lowered through the apparatus D, as well as through the equalizer valve C and well packer A to a position below the latter, for the purpose of appropriately perforating the well casing B below the well packer.

At any time thereafter, if another test is to be performed while the apparatus is in the well bore, the retrievable mandrel or body 80 need only be lowered in place, coming to rest upon the shoulder 83 of the upper sub 28, its lock dogs of latches 86 being spring-pressed outwardly into the retaining circumferential groove 84.

We claim:
1. In a tester valve adapted to be disposed in a well bore: inner and outer tubular members movable longitudinally with respect to each other, said inner member being within said outer member and having a fluid passage; valve means carried by said outer member and adapted to occupy one relative position opening said passage in response to relative longitudinal movement between said members in one direction and adapted to occupy another relative position within said passage closing said passage in response to relative longitudinal movement between said members in the opposite direction; and releasable means on said members for preventing substantial longitudinal movement between said members to retain said valve means in one of said relative positions, said releasable means being releasable to permit said members to move longitudinally with respect to each other and place said valve means in the other of said relative positions.

2. In a tester valve adapted to be disposed in a well bore: inner and outer tubular members movable longitudinally with respect to each other, said inner member being within said outer member and having a fluid passage; valve means carried by said outer member and adapted to occupy one relative position opening said passage in response to relative longitudinal movement between said members in one direction and adapted to occupy another relative position within said passage closing said passage in response to relative longitudinal movement between said members in the opposite direction; and holding means on said members for preventing substantial longitudinal movement between said members to retain said valve means in one of said relative positions and responsive to relative rotation between said members to enable said members to move relatively in one of said directions to place said valve means in the other of said relative positions.

3. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; and holding means on said members for preventing substantial longitudinal movement between said members to retain said valve means in one of said positions and responsive to rotation of said outer member by the tubular string to enable said members to move longitudinally with respect to each other and place said valve means in the other of said positions.

4. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; means providing a threaded interconnection between said members for preventing relative longitudinal movement between said members to retain said valve means in one of said positions, said threaded interconnection being responsive to rotation of said outer member by the tubular string to move said members longitudinally in one direction relative to each other and place said valve means in the other of said positions.

5. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; means providing a threaded interconnection between said members for preventing relative longitudinal movement between said members to retain said valve means in one of said positions, said threaded interconnection being responsive to rotation of said outer member by the tubular string to move said members longitudinally in one direction relative to each other and place said valve means in the other of said positions; said interconnection comprising ratchet means permitting said outer member to be moved by the tubular string longitudinally and without rotation in the other direction relative to said inner member to return said valve means from said other of said positions to said one of said positions.

6. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; means providing a threaded interconnection between said members for preventing relative longitudinal movement between said members to retain said valve means in passage closing position, said threaded interconnection being responsive to rotation of said outer member by the tubular string to move said members longitudinally in one direction relative to each other and place said valve means in passage opening position.

7. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; means providing a threaded interconnection between said members for preventing relative longitudinal movement between said members to retain said valve means in passage closing position, said threaded interconnection being responsive to rotation of said outer member by the tubular string to move said members longitudinally in one direction relative to each other and place said valve means in passage opening position; said interconnection comprising ratchet means permitting said outer member to be moved by the tubular string longitudinally and without rotation in the other direction relative to said inner member to move said valve means from passage opening position to passage closing position.

8. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; said inner member having an external thread thereon; laterally movable threaded means on said outer member meshing with said thread and responsive to rotation of said outer member by the tubular string to allow said members to move longitudinally in one direction relative to each other and place said valve means in passage opening position, said laterally movable threaded means being adapted to shift laterally out of mesh with said external thread to permit said outer member to be moved by the tubular string longitudinally without rotation in the other direction to move said valve means from passage opening position to passage closing position.

9. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; said inner member having an external thread thereon; laterally movable threaded means on said outer member meshing with said thread and responsive to rotation of said outer member by the tubular string to allow said members to move longitudinally in one direction relative to each other and place said valve means in passage opening position, said laterally movable threaded means being adapted to shift laterally out of mesh with said external thread to permit said outer member to be moved by the tubular string longitudinally without rotation in the other direction to move said valve means from passage opening position to passage closing position; and means on said outer member engageable with said laterally movable threaded means to retain said laterally movable threaded means meshed with said external thread.

10. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means disposed in said inner member passage and carried by and movable longitudinally with said outer member between a position closing said passage and a position opening said passage; said inner member having an external thread thereon; laterally movable threaded means slidably keyed to said outer member and meshing with said thread and responsive to rotation of said outer member by the tubular string to allow said members to move longitudinally in one direction relative to each other and place said valve means in passage opening position, said laterally movable threaded means being adapted to shift laterally out of mesh with said external thread to permit said outer member to be moved by the tubular string longitudinally without rotation in the other direction to move said valve means from passage opening position to passage closing position; and means on said outer member movable longitudinally of said laterally movable threaded means into engagement therewith to retain said laterally movable threaded means meshed with said external thread and movable longitudinally from engagement with said laterally movable threaded means to permit said laterally movable threaded means to move laterally from mesh with said external thread.

11. In a tester valve adapted to be lowered in a well bore on a tubular string extending to the top of the well bore: inner and outer tubular members movable longitudinally with respect to each other, said inner member being within said outer member and having a fluid passage; valve means movable longitudinally through the tubular string into and from said inner and outer members; lock means on said valve means and outer member releasably securing said valve means to said outer member; said valve means being adapted to occupy one relative position opening said passage in response to relative longitudinal movement between said members in one direction and adapted to occupy another relative position within said passage closing said passage in response to relative longitudinal movement between said members in the opposite direction; and releasable means on said members for preventing substantial longitudinal movement between said members to retain said valve means in one of said relative positions, said releasable means being releasable to permit said members to move longitudinally with respect to each other and place said valve means in the other of said relative positions.

12. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means movable longitudinally through the tubular string into and from said inner and outer members; lock means on said valve means and outer member releasably securing said valve means to said outer member for longitudinal movement therewith between a position in said inner member closing said passage and a position opening said passage; and holding means on said members for preventing substantial longitudinal movement between said members to retain said valve means in one of said positions and responsive to rotation of said outer member by the tubular string to enable said members to move longitudinally with respect to each other and place said valve means in the other of said positions.

13. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means movable longitudinally through the tubular string into and from said inner and outer members; lock means on said valve means and outer member releasably securing said valve means to said outer member for longitudinal movement therewith between a position in said inner member closing said passage and a position opening said passage; means providing a threaded interconnection between said members for preventing relative longitudinal movement between said members to retain said valve means in one of said positions, said threaded interconnection being responsive to rotation of said outer member by the tubular string to move said members longitudinally in one direction relative to each other and place said valve means in the other of said positions; said interconnection comprising ratchet means permitting said outer member to be moved by the tubular string longitudinally and without rotation in the other direction relative to said inner member to return said valve means from said other of said positions to said one of said positions.

14. In a tester valve adapted to be lowered in a well bore on a tubular string extending to the top of the well bore: an inner tubular member having a passage; an outer tubular member surrounding said inner member and movable longitudinally with respect thereto; said outer member having means thereon for securing said outer member to the tubular string; valve means movable longitudinally through the tubular string into and from said inner and outer members; lock means on said valve means and outer member releasably securing said valve means to said outer member for longitudinal movement therewith between a position in said inner member closing said passage and a position opening said passage; said inner member having an external thread thereon; laterally movable threaded means slidably keyed to said outer member and meshing with said thread and responsive to rotation of said outer member by the tubular string to allow said members to move longitudinally in one direction relative to each other and place said valve means in passage opening position, said laterally movable threaded means being adapted to shift laterally out of mesh with said external thread to permit said outer member to be moved by the tubular string longitudinally without rotation in the other direction to move said valve means from passage opening position to passage closing position; and means on said outer member movable longitudinally of said laterally movable threaded means into engagement therewith to retain said laterally movable threaded means meshed with said external thread and movable longitudinally from engagement with said laterally movable threaded means to permit said laterally movable threaded means to move laterally from mesh with said external thread.

15. In a tester valve adapted to be disposed in a well bore: inner and outer members movable longitudinally with respect to each other and having a passage therethrough, said inner member being within said outer member; coengageable means on said members adapted to occupy one relative position opening said passage in response to relative longitudinal movement between said members in one direction and adapted to occupy another relative position closing said passage in response to relative longitudinal movement between said members in the opposite direction; one of said members having a thread thereon; laterally movable threaded means on the other of said members meshing with said thread for preventing substantial longitudinal movement between said members and responsive to relative rotation between said members to enable said members to move relatively in one of said directions to place said members in one of said relative positions, said laterally movable threaded means being adapted to shift laterally out of mesh with said thread to permit said members to move relatively longitudinally in the other of said directions without relative rotation between said members to place said members in the other of said relative positions; and means on said other of said members engageable with said laterally movable threaded means to retain said laterally movable threaded means meshed with said thread.

16. In a tester valve adapted to be disposed in a well bore: inner and outer members movable longitudinally with respect to each other and having a passage therethrough, said inner member being within said outer member; coengageable means on said members adapted to occupy one relative position opening said passage in response to relative longitudinal movement between said members in one direction and adapted to occupy another relative position closing said passage in response to relative longitudinal movement between said members in the opposite direction; one of said members having a thread thereon; laterally movable threaded means slidably keyed to the other of said members and meshing with said thread for preventing substantial longitudinal movement between said members and responsive to relative rotation between said members to enable said members to move relatively in one of said directions to place said members in one of said relative positions, said laterally movable threaded means being adapted to shift laterally out of mesh with said thread to permit said members to move relatively longitudinally in the other of said directions without relative rotation between said members to place said members in the other of said relative positions; and means on said other of said members movable longitudinally of said laterally movable threaded means into engagement therewith to retain said laterally movable threaded means meshed with said thread and movable laterally from engagement with said laterally movable threaded means to permit said laterally movable threaded means to move laterally from mesh with said thread.

17. In valve apparatus adapted to be disposed in a well bore: inner and outer telescopically related members having a passage establishing communication between the interior of said members and the well bore externally thereof; coengageable means on said members closing said passage when said members are in one relative telescopic position and opening said passage when said members are in another relative telescopic position; means providing a threaded interconnection between said members responsive to relative rotation between said members to place said members in one of said telescopic positions, said interconnection comprising ratchet means permitting telescopic movement without rotation between said members from said one of said telescopic positions to the other of said telescopic positions.

18. In valve apparatus adapted to be disposed in a well bore: inner and outer telescopically related members having a passage establishing communication between the interior of said members and the well bore externally thereof; coengageable means on said members closing said passage when said members are in one relative telescopic position and opening said passage when said members are in another relative telescopic position; said inner member having an external thread thereon; laterally movable threaded means on said outer member meshing with said thread and responsive to relative rotation between said members to place said members in one of said telescopic positions, said laterally movable threaded means being adapted to shift laterally out of mesh with said external thread to permit telescopic movement between said members from said one of said telescopic positions to the other of said telescopic positions.

19. In valve apparatus adapted to be disposed in a well bore: inner and outer telescopically related members having a passage establishing communication between the interior of said members and the well bore externally thereof; coengageable means on said members closing said passage when said members are in one relative telescopic position and opening said passage when said members are in another relative telescopic position; said inner member having an external thread thereon; laterally movable threaded means on said outer member meshing with said thread and responsive to relative rotation between said members to place said members in one of said telescopic positions, said laterally movable threaded means being adapted to shift laterally out of mesh with said external thread to permit telescopic movement between said members from said one of said telescopic positions to the other of said telescopic positions; and means on said outer member engageable with said laterally movable threaded means to retain said laterally movable threaded means meshed with said external thread.

20. In valve apparatus adapted to be disposed in a well bore: inner and outer telescopically related members having a passage establishing communication between the interior of said members and the well bore externally thereof; coengageable means on said members closing said passage when said members are in one relative telescopic position and opening said passage when said members are in another telescopic position; said inner member having an external thread thereon; laterally movable threaded means slidably keyed to said outer member and meshing with said thread and responsive to relative rotation between said members to place said members in one of said telescopic positions, said laterally movable threaded means being adapted to shift laterally out of mesh with said external thread to permit telescopic movement between said members from said one of said telescopic positions to the other of said telescopic positions; and means on said outer member movable longitudinally of said laterally movable threaded means into engagement therewith to retain said laterally movable threaded means meshed with said external thread and movable laterally from engagement with said laterally movable threaded means to permit said laterally movable threaded means to move laterally from mesh with said external thread.

21. In valve apparatus adapted to be disposed in a well bore: inner and outer telescopically related members providing a fluid passage; coengageable means on said members closing said passage when said members are in one relative telescopic position and opening said passage when said members are in another relative telescopic position; said inner member having an external thread thereon; laterally movable threaded means slidably keyed to said outer member and meshing with said thread and responsive to relative rotation between said members to place said members in one of said telescopic positions, said laterally movable threaded means being adapted to shift laterally out of mesh with said external thread to permit telescopic movement between said members from said one of said telescopic positions to the other of said telescopic positions; and means on said outer member movable longitudinally of said laterally movable threaded means into engagement therewith to retain said laterally movable threaded means meshed with said external thread and movable laterally from engagement with said laterally movable threaded means to permit said laterally movable threaded means to move laterally from mesh with said external thread.

22. In tester and reversing valve apparatus adapted to be disposed in a well bore on a tubular string extending to the top of the well bore: inner and outer tubular members movable longitudinally with respect to each other and having a tester passage therethrough, said inner member being within said outer member, said members providing a reversing passage for fluid between the interior of said members and the interior of the tubular string thereabove, on the one hand, and the well bore externally thereof, on the other hand; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; and means on said members for controlling relative longitudinal movement therebetween to determine the open and closed conditions of said tester passage and reversing passage.

23. In tester and reversing valve apparatus adapted to be disposed in a well bore on a tubular string extending to the top of the well bore: inner and outer tubular members movable longitudinally with respect to each other and having a tester passage therethrough, said inner member being within said outer member, said members providing a reversing passage for fluid between the interior of said members and the interior of the tubular string thereabove, on the one hand, and the well bore externally thereof, on the other hand; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; and means on said members for controlling relative longitudinal movement therebetween to selectively control said passages, whereby said tester passage and reversing passage are concurrently in closed position, said tester passage is in open condition while said reversing passage is in closed condition, or said tester passage is in closed condition while said reversing passage is in open condition.

24. In tester and reversing valve apparatus adapted to be disposed in a well bore on a tubular string extending to the top of the well bore: inner and outer tubular members movable longitudinally with respect to each other, said inner member being within said outer member and having a tester passage, said members providing a reversing passage for fluid between the interior of said members and the interior of the tubular string thereabove, on the one hand, and the well bore externally thereof, on the other hand; tester valve means disposed in said tester passage and carried by and movable longitudinally with said outer member between a position closing said tester passage and a position opening said tester passage; coengageable reversing valve means on said members movable between positions opening and closing said reversing passage in response to relative longitudinal movement between said members; and means on said members for selectively placing said members longitudinally with respect to each other in different positions such that said tester passage and reversing passage are simultaneously in closed condition, said tester passage is open while said reversing passage is closed, or said tester passage is closed while said reversing passage is open.

25. In tester and reversing valve apparatus adapted to be disposed in a well bore: inner and outer tubular members movable longitudinally with respect to each other and having a tester passage therethrough, said inner member being within said outer member, said members providing a reversing passage for fluid between the interior of said members and the well bore externally thereof; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; threaded interconnecting means between said members for preventing relative longitudinal movement between said members to retain said tester passage and reversing passage in closed condition, said threaded interconnecting means being responsive to relative rotation between said members to move said members longitudinally relative to each other to open said tester passage while said reversing passage remains in closed condition or to open said reversing passage while said tester passage remains in closed condition.

26. In tester and reversing valve apparatus adapted to be disposed in a well bore: inner and outer tubular members movable longitudinally with respect to each other and having a tester passage therethrough, said inner member being within said outer member, said members providing a reversing passage for fluid between the interior of said members and the well bore externally thereof; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; one of said members having a right-hand threaded portion and a left-hand threaded portion thereon; laterally movable threaded means on the other of said members adapted to mesh with said threaded portions and responsive to relative rotation between said members to allow said members to move longitudinally with respect to each other to selectively open and close said tester passage and reversing passage; said laterally movable threaded means being adapted to shift laterally out of mesh with one of said threaded portions to permit said members to move longitudinally relative to each other and place one of said passages in either its open or closed condition.

27. In tester and reversing valve apparatus adapted to be disposed in a well bore: inner and outer tubular members movable longitudinally with respect to each other and having a tester passage therethrough, said inner member being within said outer member, said members providing a reversing passage for fluid between the interior of said members and the well bore externally thereof; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; said inner member having an external right-hand threaded portion and an external left-hand threaded portion; laterally movable threaded means on said outer member and adapted to mesh with one of said threaded portions and responsive to relative rotation between said members in one direction to allow said members to move longitudinally in one direction relative to each other to open said tester passage, said laterally movable threaded means being adapted to mesh with the other of said threaded portions and responsive to relative rotation between said members in said one direction to allow said members to move longitudinally in the opposite direction relative to each other to open said reversing passage; said laterally movable threaded means being adapted to shift laterally out of mesh with said threaded portions to permit said members to move longitudinally relative to each other; and means on said outer member engageable with said laterally movable threaded means to retain said laterally movable threaded means selectively meshed with said right-hand threaded portion or said left-hand threaded portion.

28. In tester and reversing valve apparatus adapted to be disposed in a well bore: inner and outer tubular members movable longitudinally with respect to each other and having a tester passage therethrough, said inner member being within said outer member, said members providing a reversing passage for fluid between the interior of said members and the well bore externally thereof; first coengageable means on said members adapted to occupy one relative position opening said tester passage in response to relative longitudinal movement between said members in one direction and adapted to occupy another relative position closing said tester passage in response to relative longitudinal movement between said members in the opposite direction; second coengageable means on said members adapted to occupy one relative position opening said reversing passage in response to relative longitudinal movement between said members in one direction and adapted to occupy another relative position closing said reversing passage in response to relative longitudinal movement between said members in the opposite direction; said inner member having an external right-hand threaded portion and an external left-hand threaded portion; first laterally movable threaded means slidably keyed to said outer member and adapted to mesh with said right-hand threaded portion; second laterally movable threaded means slidably keyed to said outer member and adapted to mesh with said left-hand threaded portion; one of said threaded means meshing with its companion threaded portion and responsive to relative rotation between said members in one direction to allow said members to move longitudinally in one direction relative to each other to open said tester passage; the other of said threaded means being adapted to mesh with its companion threaded portion and responsive to relative rotation between said members in said one direction to allow said members to move longitudinally in the opposite direction relative to each other to open said reversing passage; said first and second threaded means being adapted to shift laterally out of mesh with their respective threaded portions to permit said threaded means to move relatively longitudinally along said inner member; first retaining means on said outer member movable longitudinally of said first threaded means into engagement therewith to retain said first threaded means meshed with said right-hand threaded portion; second retaining means on said outer member movable longitudinally of said second threaded means into engagement therewith to retain said second threaded means meshed with said left-hand threaded portion; said first retaining means being movable longitudinally from engagement with said first threaded means when said second retaining means is movable into engagement with said second threaded means and said second retaining means being movable from engagement with said second threaded means when said first retaining means is movable into engagement with said first threaded means.

References Cited by the Examiner
UNITED STATES PATENTS

| | | | |
|---|---|---|---|
| 2,719,588 | 10/1955 | Huber | 166—152 |
| 2,893,492 | 7/1959 | Brown | 166—121 X |
| 2,901,001 | 8/1959 | Nutter | 166—152 X |
| 3,051,240 | 8/1962 | Fisher | 166—131 |
| 3,190,360 | 6/1965 | Farley | 166—226 |
| 3,221,820 | 12/1965 | Myers | 166—226 X |

CHARLES E. O'CONNELL, *Primary Examiner.*

D. H. BROWN, *Assistant Examiner.*

Disclaimer 3,311,173.—*Waldo W. Henslee, Jr.*, and *Darryl W. Cockrell*, Houston, Tex. WELL BORE TESTING APPARATUS. Patent dated Mar. 28, 1967. Disclaimer filed Aug. 9, 1968, by the assignee, *Baker Oil Tools, Inc.*

Hereby enters this disclaimer to claims 22 and 23 of said patent.

[*Official Gazette January 7, 1969.*]